Jan. 20, 1959    R. R. WAREHAM    2,869,444
PHOTOGRAPHIC APPARATUS
Filed Nov. 12, 1957    2 Sheets-Sheet 1
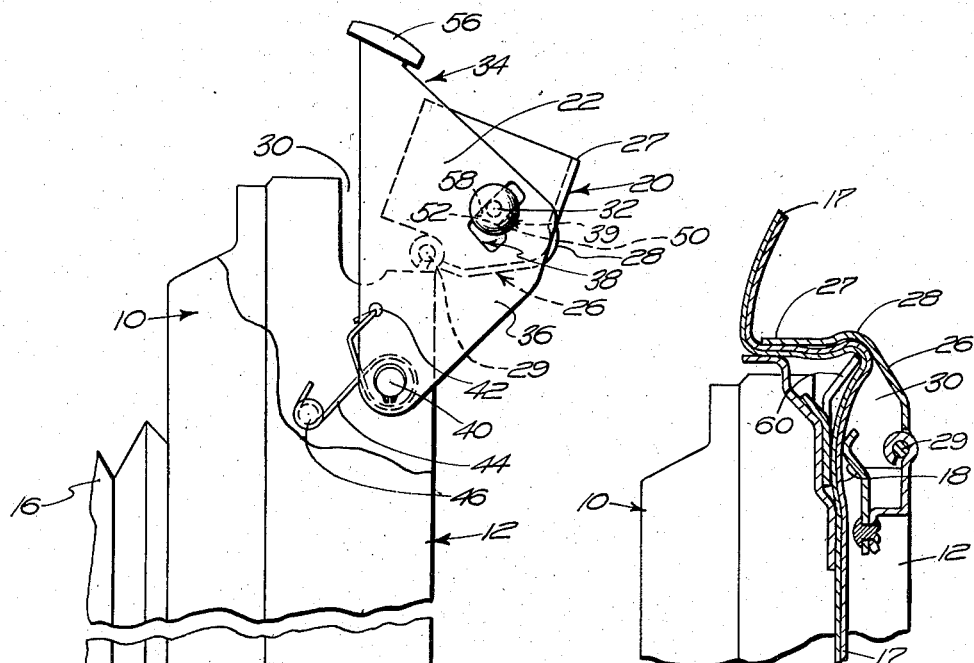
FIG. 1
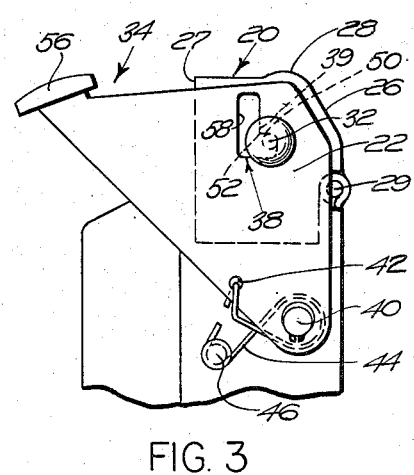
FIG. 2
FIG. 3
INVENTOR.
Richard R. Wareham
BY
Brown and Mikulka
Attorneys Jan. 20, 1959   R. R. WAREHAM   2,869,444
PHOTOGRAPHIC APPARATUS
Filed Nov. 12, 1957   2 Sheets-Sheet 2 ure Jan. 20, 1959

2,869,444

PHOTOGRAPHIC APPARATUS

Richard R. Wareham, Marblehead, Mass., assignor to Polaroid Corporation, Cambridge, Mass., a corporation of Delaware Application November 12, 1957, Serial No. 695,768

17 Claims. (Cl. 95—13)

This invention relates to photography, and more particularly to novel locking means for devices for severing photographic sheet materials which extend from a chamber, for example an imbibition chamber, in a camera.

Hitherto, cutting devices of the type hereinafter described, for severing photographic sheet materials extending through an aperture leading into an imbibition chamber in a "Land" camera, have been locked into an operative position by such methods as simple friction locking devices as described in U. S. Patent 2,510,306, issued June 6, 1950 to A. J. Bachelder, or by the positive locking action of a pin and deformable arm mechanism as described in U. S. Patent No. 2,740,342, issued April 3, 1956, to Herbert A. Bing et al. While these methods have been satisfactory, the present invention comprehends an improved locking means having both simplicity and positive locking action.

Accordingly, it is an object of this invention to provide a novel, simple means for positively locking a device for severing photographic sheet materials which extend from a camera.

Another object of this invention is to provide novel means for releasing a rigidly locked device for severing photographic sheet materials which extend from a camera.

Other objects of this invention will in part be obvious and will in part appear hereinafter.

This invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a diagrammatic fragmentary view of a handheld camera embodying the herein disclosed invention, wherein the device is shown in an open or inoperative position;

Fig. 2 is a fragmentary sectional view showing the elements of the camera associated with this invention;

Fig. 3 is a fragmentary view showing camera and mechanism of Figure 1 in a closed or operative position;

Figure 4:
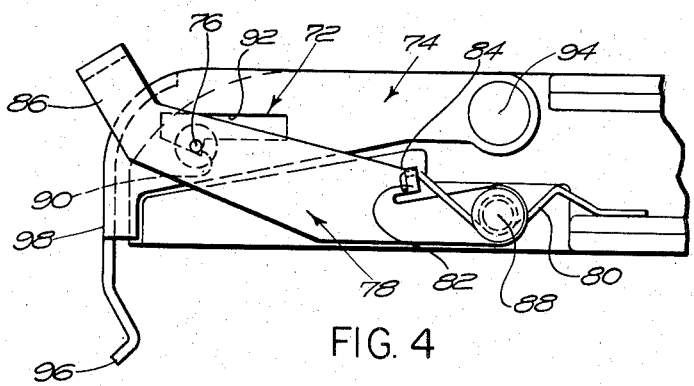
Fig. 4 is a fragmentary view showing a camera embodying another form of this invention wherein the device is shown in closed or operative position.
Figure 5:
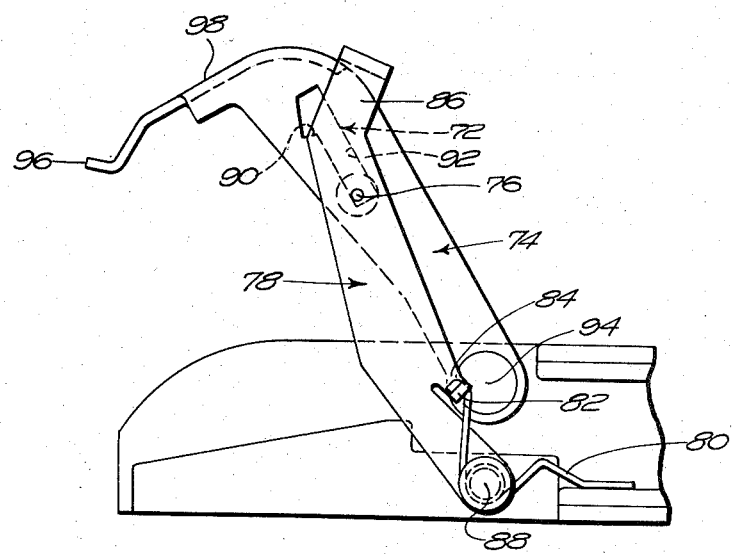
Fig. 5 is a fragmentary view showing camera and mechanism of Fig. 4 in an open or inoperative position.

The invention is adapted for incorporation into the structure of a "Land" camera of the type shown in U. S. Patent No. 2,740,340, issued April 3, 1956, to Herbert A. Bing and James E. Hunter, Jr. for photographic apparatus having an imbibition chamber wherein photographic sheet materials are processed and from which continuous predetermined portions of said materials are manually withdrawn through an aperture in the housing in the camera and severed from said materials remaining therein. As a means for severing said portions of said materials, a cutter bar is mounted on the camera housing adjacent the aperture leading into an imbibition chamber, for movement relative to said housing between an open or inoperative position and a closed or operative position. The cutter bar comprises means for both severing said portions of said materials and for occluding light from the imbibition chamber by sealing said aperture. The invention is so mounted on the camera that pivoting the cutter bar into an operative or closed position engages a rigid, positive locking means whereby the said bar is retained in said position, thus relieving the operator from any necessity of manually holding said bar in position while the sheet materials are forced across said bar for cutting. The locking means also provides for instantaneous disengagement whereby the release of the locking means by the operator simultaneously results in the cutter bar being pivoted to an inoperative or open position, allowing withdrawal of the next successive portion of the photographic sheet materials.

Referring now to Figures 1 through 3, the camera comprises housing portions 10 and 12 mounted for pivotal movement with respect to one another by hinge 14. A fragment of the bellows 16 is shown, it being understood that the operative elements of the camera may be similar to those of the camera described in the above-mentioned Patent No. 2,740,340. Photographic sheet materials 17 are withdrawable through passage 18 provided between the housing portions 12 and 13 with the said portions in a closed position as shown.

In the embodiment of the invention shown in Figs. 1, 2, and 3, a yoke-like element 20 comprising arm 22, a corresponding arm (not shown) and a transverse member 26 having both a straight edge portion 27 and an arcuate cross-section 28 and joining said arms, is pivotally attached on housing portion 12 of the camera by hinge means 29 engaging arms 22 and 24. Member 26 coupled with arms 22 and 24, comprising a cutter bar, also provides a closure for aperture 30 leading into passage 18, thereby occluding light from aperture 30 and associated passage 18. Attached to and projecting laterally outward from arm 22 away from housing portion 12 is an engagement member, such as pin 32.

Mounted for pivotal movement on housing portion 12 of the camera adjacent arm 22 and being in the same plane thereas, is lever 34 comprising lever extension 36, said extension being provided therein with an engagement portion such as an L-shaped cam slot 38 in slidable engagement with pin 32, said portion including a shoulder-shaped surface 39. A means for mounting lever blade 34 comprises pivot means 40. A resilient means, such as torsion spring 44, may be anchored at one end to lever 34 by means comprising opening 42 in lever 34, into which opening one end of spring 44 may be fitted, spring 44 being anchored at its other end to housing portion 12 as at projection 46. Resilient means 44 in conjunction with hinge 29 comprise a means for imparting a bias to element 20 for urging said element into a closed position.

As a means for locking the mechanism, shoulder 39 of engagement portion 38 is provided with a face 50 to which pin 32 is adjacent when element 20 is in a closed position. Pressure applied transversely to edge portion 27 of member 26 when element 20 is in said closed position, as by forceably drawing photographic sheet materials across said edge, will tend to urge element 20 pivotably about hinge 29, said movement being opposed by said bias of spring 44. Arm 22 essentially constitutes a "lever" arm having a fulcrum at hinge 29, the locus of that point on attached pin 32 nearest hinge 29 during pivotal movement of arm 22 being an arc of predetermined curvature and having its center of curvature at hinge 29. Lever 34 constitutes a similar "lever" arm, but one having a fulcrum at pivot 40; the locus of the point 52 of the shoulder 39 of L-shaped cam slot 38 during pivotal movement of blade 34 being an arc of another predetermined curvature and having its center of curvature at pivot 40. Both arm 22 and lever 34 are shaped such that said locus of pin 32 and said locus of point 52 intersect where the relative positions of arm 22 and lever 34 are such that element 20 is in a closed position. Because the arcuate locus of pin 32 curves inside of the arcuate locus of shoulder-shaped surface 39 the tendency of element 20 to thus pivot is arrested by face 50 and element 20 remains locked in position. In the design of the mechanism, it is essential that the loci aforementioned have distinct and different centers of curvature, both centers being located on housing portion 12, both arcuate loci intersecting at a point where the relative positions of their transcribing elements are such that said element 20 is in a closed position relative to aperture 30.

As a means for enabling the operator to release element 20, there is mounted on lever 34 release means comprising button 56. Pressure manually applied to button 56 forces lever 34 to pivot about pivot 40. Inasmuch as the arcuate locus of shoulder-shaped surface 39 lies outside the arcuate locus of pin 32, there being no restraint on cam face 50 by pin 32, lever 34 pivots until a sliding surface such as cam face 58 of engagement portion 38 strikes pin 32. The force of cam face 58 striking against pin 32 causes element 20 to pivot about hinge 29. As the pressure of face 52 adjacent pin 32 pivots element 20, pin 32 slides along face 58, thereby allowing the free pivotal movement of lever 34 and arm 22 while still maintaining engagement between them. The open position of element 20 may be determined by limiting the elasticity or size of torsion spring 44, by limiting the rotary movement of pivot 29, by limiting the rotary movement of hinge 40, or by shaping face 58 such that it presents a mechanical stop at the proper position.

When element 20 is in a closed or operative position, photographic sheet materials 17 extend through passage 18 and are supported by angular guide strips 60 positioned so as to require the said material to curve sharply around the ends of said guide, the curvature of the sheets conforming substantially to the arcuate cross-section 28 of the inner surface of member 26. A short portion of sheet materials 17 extending from aperture 30 provides a leader which may be grasped to withdraw portions of said materials. When element 20 is in a closed position and is positively held in said position by the aforementioned locking means, a portion of sheet materials 17 may be severed by manually drawing or tearing the same against a suitably formed or sharpened edge of straight-edge portion 27 of connecting member 26.

After the said sheet materials are severed, the yoke-like element 20 comprising a cutter bar may be unlocked and pivoted to an open position by pressure on release button 56, permitting said leader to be grasped and another portion of said sheet materials to be thereby withdrawn, whereupon button 56 may be released allowing said cutter bar to return to a closed position under the bias of torsion spring 44 and the severing operation repeated.

In Figs. 3 and 4 a diagrammatic view is shown of the invention in a somewhat different embodiment. It should be noted that the engagement portion here comprising L-shaped cam slot 72 is herewith integral with arm 74 instead of, as in the previously disclosed embodiment, with the lever of the mechanism. Similarly, the engagement member here comprising pin 76 is mounted on lever 78 instead of on the arm of the yoke-like element as previously disclosed. Torsion spring 80 is anchored to lever 78 by means comprising stud 82 on finger 84 of lever 78, it being understood that spring 80 may also be anchored in substantially the same manner as analogous spring 44 as previously disclosed herein.

In operation, the cutter bar being in a closed position, pressure applied manually to skewed portion 86 of lever 78 forces lever 78 to move pivotably about pivot 88. Lever 78 moves from a position wherein attached pin 76 abuts surface 90 of cam slot 72 to a position wherein pin 76 strikes sliding surface 92, causing the cutter bar comprising arm 74 to pivotally move about hinge 94. As the pressure of pin 76 against sliding surface 92 pivots arm 74, pin 76 slides along surface 92, thereby allowing free pivotal movement of lever 78 and arm 74 while still maintaining engagement between them.

Release of pressure on skewed portion 86 allows spring 80 to force lever 78 against surface 94 of cam surface 72, thus causing a return movement of both blade 78 and arm 74.

If, however, pressure is applied transversely to edge 96 of member 98, surface 90 is forced against pin 76 and the pivotal motion of arm 74 is restrained. Hence, cam slot 72 and pin 76 provide substantially the same releasable positive locking means as disclosed in the embodiment shown in Figs. 1 through 3.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photographic apparatus wherein photosensitive sheet materials are processed, said apparatus having an aperture formed therein, from which aperture portions of said sheet materials may be withdrawn, the combination with said apparatus of a sheet-severing means comprising a yoke-like element including a cutter bar having a longitudinal edge for severing portions of said sheet materials extending through said aperture, and at least two arms appended to opposite end portions of said bar, said arms being coaxially mounted on said apparatus adjacent said aperture for pivotal movement between a first position wherein said element covers said aperture and a displaced position wherein said element is to one side of said aperture, a lever mounted on said apparatus adjacent at least one of said arms for pivotal movement about an axis disposed substantially parallel to and adjacent the axis of said arms, one of said lever and said one arm including an engagement portion having a shoulder-shaped surface, said surface being movable with said one of said lever and said one arm in a first arc about said pivotal axis of said one of said lever and said one arm, the other of said lever and said one arm including an engagement member attached thereto and being movable therewith in a second arc about said pivotal axis of said other of said lever and said one arm, said first arc of movement intersecting said second arc of movement at a point at which that one of said engagement member and said shoulder-shaped surface attached to said lever obstructs the arcuate movement of the other one of said engagement member and said shoulder-shaped surface, at said point said yoke-like element being thereby locked in said first position wherein said portion of sheet materials may be drawn against and severed by said longitudinal edge, said obstruction being releasable by pivotal movement of said lever.

2. In a photographic apparatus wherein photosensitive sheet materials are processed, said apparatus having an aperture formed therein, from which aperture portions of said sheet materials may be withdrawn, the combination with said apparatus of a sheet-severing means comprising a yoke-like element including a cutter bar having a longitudinal edge for severing portions of said sheet materials extending through said aperture, and at least two arms appended to opposite end portions of said bar, said arms being coaxially mounted on said apparatus adjacent said aperture for pivotal movement between a first position wherein said element covers said aperture and a displaced position wherein said element is to one side of said aperture, a lever mounted on said apparatus adjacent at least one of said arms for pivotal movement about an axis disposed substantially parallel to and adjacent the pivotal axis of said arms, said lever including an engagement portion having a shoulder-shaped surface, said surface being movable with said lever in a first arc about said pivotal axis of said lever, said one arm having an engagement member thereon, said member being movable with said arm in a second arc about said pivotal axis of said one arm, said first arc of movement intersecting said second arc of movement at a point at which said shoulder-shaped surface obstructs the arcuate movement of said engagement member, said yoke-like element being thereby locked in said first position wherein said portion of sheet materials may be drawn against and severed by said longitudinal edge, said shoulder-shaped surface being movable from obstructing said engagement member by pivotal movement of said lever.

3. In a photographic apparatus wherein photosensitive sheet materials are processed, said apparatus having an aperture formed therein, from which aperture portions of said sheet materials may be withdrawn, the combination with said apparatus of a sheet-severing means comprising a yoke-like element including a cutter bar having a longitudinal edge for severing portions of said sheet materials extending through said aperture, and at least two arms appended to opposite end portions of said bar, said arms being coaxially mounted on said apparatus adjacent said aperture for pivotal movement between a first position wherein said element covers said aperture and a displaced position wherein said element is to one side of said aperture, a lever mounted on said apparatus adjacent at least one of said arms for pivotal movement about an axis disposed substantially parallel to and adjacent the pivotal axis of said arms, said one arm including an engagement portion having a shoulder-shaped surface, said surface being movable with said arm in a first arc about said pivotal axis of said arm, said lever including an engagement member thereon, said engagement member being movable with said lever in a second arc about said pivotal axis of said lever, said first arc of movement intersecting said second arc of movement at a point at which the arcuate movement of said shoulder-shaped surface is obstructed by said engagement member, said yoke-like element being thereby locked in said first position wherein said first portion of sheet materials may be drawn against and severed by said longitudinal edge, said engagement member being releasable from obstructing said shoulder-shaped surface by pivotal movement of said lever.

4. In a photographic apparatus wherein photosensitive sheet materials are processed, said apparatus having an aperture formed therein, from which aperture portions of said sheet materials may be withdrawn, the combination with said apparatus of a sheet-severing means comprising a yoke-like element including a cutter bar having a longitudinal edge for severing portions of said sheet materials extending through said aperture, and at least two arms appended to opposite end portions of said bar, said arms being coaxially mounted on said apparatus adjacent said aperture for pivotal movement between a first position wherein said element covers said aperture and a displaced position wherein said element is to one side of said aperture, a lever mounted on said apparatus adjacent at least one of said arms for pivotal movement about an axis disposed substantially parallel to and adjacent the pivotal axis of said arms, said one arm including an engagement member attached thereto, said engagement member being movable with said arm in a first arc about said pivotal axis of said arm, said lever including an engagement portion, said engagement portion comprising a shoulder-shaped surface and a sliding surface opposite said shoulder-shaped surface, said engagement portion being movable with said lever in a second arc about said pivotal axis of said lever, said first arc of movement intersecting said second arc of movement at a point at which said shoulder-shaped surface engages said engagement member and obstructs the arcuate movement of said engagement member, whereby said yoke-like element is locked in said first position wherein said portion of sheet materials may be drawn against and severed by said longitudinal edge, said shoulder-shaped surface being releasable from obstructing said engagement member by pivotal movement of said lever, said lever and said engagement portion being pivotable to a contact position at which said engagement member is engaged by said sliding surface of said engagement portion, said yoke-like element being pivotable to said displaced position by pivotal motion of said lever urging said sliding surface against said engagement member.

5. The photographic apparatus as defined in claim 4, wherein said engagement portion comprises an L-shaped slot.

6. The photographic apparatus as defined in claim 4, wherein said engagement member comprises a pin.

7. The photographic apparatus as defined in claim 4, wherein said apparatus comprises a projection attached thereto adjacent said pivotal axis of said lever, said lever includes an aperture therein, and resilient means for biasing said lever into a position wherein said engagement portion obstructs said engagement surface, said resilient means being anchored at one end in said lever aperture and at the other end to said projection.

8. A photographic apparatus as defined in claim 4, wherein said engagement portion comprises an L-shaped slot, and wherein said engagement member comprises a pin.

9. A photographic apparatus as defined in claim 4, wherein said apparatus comprises a projection attached thereto adjacent said pivotal axis of said lever, said lever includes an aperture therein, resilient means for biasing said lever into a position wherein said engagement portion obstructs said engagement surface, said resilient means being anchored at one end in said lever aperture and at the other end to said projection, said engagement portion comprises an L-shaped slot, and said engagement member comprises a pin.

10. In a photographic apparatus wherein photosensitive sheet materials are processed, said apparatus having an aperture formed therein, from which aperture portions of said sheet materials may be withdrawn, the combination with said apparatus of sheet-severing means comprising a yoke-like element including a cutter bar having a longitudinal edge for severing portions of said sheet materials extending through said aperture, and at least two arms appended to opposite end portions of said bar, said arms being coaxially mounted on said apparatus adjacent said aperture for pivotal movement between a first position wherein said element covers said aperture and a displaced position wherein said element is to one side of said aperture, a lever mounted on said apparatus adjacent at least one of said arms for pivotal movement about an axis disposed substantially parallel to and adjacent the pivotal axis of said arms, said lever having an engagement member attached thereto and being movable therewith in a first arc about said pivotal axis of said lever, said one arm including an engagement portion comprising a shoulder-shaped surface and a sliding surface opposite said shoulder-shaped surface, said engagement portion being movable with said arm in a second arc about said pivotal axis of said arm, said first arc of movement intersecting said second arc of movement at a point at which said engagement member engages said shoulder-shaped surface and obstructs said arcuate movement of said shoulder-shaped surface, whereby said yoke-like element is locked in said first position wherein said portions of sheet materials may be drawn against and severed by said longitudinal edge, said engagement member being releasable from obstructing said shoulder-shaped surface by pivotal movement of said lever, said lever and said engagement member being pivotable to a position at which said engagement member engages said sliding surface, said yoke-like element being thereby pivotable to said displaced position by pivotal motion of said lever urging said engagement member against said sliding surface.

11. The photographic apparatus as defined in claim 10, wherein said engagement portion comprises an L-shaped slot.

12. The photographic apparatus as defined in claim 10, wherein said engagement member comprises a pin.

13. A photographic apparatus as defined in claim 10, wherein said apparatus comprises a projection attached thereto adjacent said pivotal axis of said lever, said lever includes an aperture therein, and resilient means for biasing said lever into a position wherein said engagement surface obstructs said engagement portion, said resilient means being anchored at one end in said lever aperture and at the other end to said projection.

14. A photographic apparatus as defined in claim 10, wherein said engagement member comprises a pin, and wherein said engagement portion comprises an L-shaped slot.

15. A photographic apparatus as defined in claim 10, wherein said apparatus comprises a projection attached thereto adjacent said pivotal axis of said lever, said lever includes an aperture therein, resilient means for biasing said lever into a position wherein said engagement surface obstructs said engagement portion, said resilient means being anchored at one end in said lever aperture and at the other end to said projection, said engagement member comprises a pin, and said engagement portion comprises an L-shaped slot.

16. In a photographic apparatus wherein photosensitive sheet materials are processed, said apparatus having an aperture formed therein, from which aperture portions of said sheet materials may be withdrawn, the combination with said apparatus of a sheet-severing means comprising a cutter bar having an edge for severing portions of said sheet materials extending through said aperture, at least one arm appended at an angle to an end portion of said bar and being mounted on said apparatus adjacent said aperture for pivotal movement between a first position wherein said sheet-severing means covers said aperture and a displaced position wherein said sheet-severing means is to one side of said aperture, a lever mounted on said apparatus adjacent said arm for pivotal movement about an axis disposed substantially parallel to and adjacent the pivotal axis of said arm, one of said lever and said arm including an engagement portion having a cam surface, said surface being movable with said one of said lever and said arm in a first arc about the pivotal axis of said one of said lever and said arm, the other of said lever and said arm including an engagement member attached thereto and being movable therewith in a second arc about the pivotal axis of said other of said lever and said arm, said first arc of movement intersecting said second arc of movement at a point at which that one of said engagement member and said surface which is attached to said lever obstructs the arcuate movement of the other one of said engagement member and said surface, at said point said sheet-severing means being thereby locked in said first position wherein said portion of sheet materials may be drawn against and severed by said edge.

17. In a photographic apparatus wherein photosensitive sheet materials are processed, said apparatus having an aperture formed therein, from which aperture portions of said sheet materials may be withdrawn, the combination with said apparatus of a sheet-severing means comprising a cutter bar having an edge for severing portions of said sheet materials extending through said aperture, at least two arms appended to opposite end portions of said bar, said arms being coaxially mounted on said apparatus adjacent said aperture for pivotal movement between a first position wherein said sheet-severing means covers said aperture and a displaced position wherein said sheet-severing means is to one side of said aperture, a lever mounted on said apparatus adjacent at least one of said arms for pivotal movement about an axis disposed substantially parallel to and adjacent the axis of said arms, one of said lever and said one arm including an engagement portion having a cam surface, said surface being movable with said one of said lever and said one arm in a first arc about said pivotal axis of said one of said lever and said one arm, the other of said lever and said one arm including an engagement member attached thereto and being movable therewith in a second arc about said pivotal axis of said other of said lever and said one arm, said first arc of movement intersecting said second arc of movement at a point at which that one of said engagement member and said surface which is attached to said lever obstructs the arcuate movement of the other one of said engagement member and said surface, at said point said sheet-severing means being thereby locked in said first position wherein said portion of sheet materials may be drawn against and severed by said edge.

References Cited in the file of this patent
UNITED STATES PATENTS 2,740,342     Bing et al.     Apr. 3, 1956